United States Patent

[11] 3,590,854

[72] Inventor Gordon H. Cork
    Birmingham, Mich.
[21] Appl. No. 770,468
[22] Filed Oct. 9, 1968
[45] Patented July 6, 1971
[73] Assignee Gemco Electric Company
    Clawson, Mich.
    Continuation-in-part of application Ser. No.
    670,646, Sept. 26, 1967, now abandoned.

[54] ROLLING CONDUCTOR SUPPORT
    28 Claims, 34 Drawing Figs.
[52] U.S. Cl. .................................................. 137/355.16
[51] Int. Cl. ...................................................... B65h 75/36
[50] Field of Search .................................... 137/355.16;
    248/49; 191/12 C, 12; 251/143; 292/87, 89, 91

[56] References Cited
    UNITED STATES PATENTS

| | | | |
|---|---|---|---|
| 2,641,493 | 6/1953 | Flugrath | 292/19 |
| 3,053,358 | 9/1962 | Gross | 52/696 |
| 3,085,135 | 4/1963 | Brandin | 191/12 C |
| 3,157,376 | 11/1964 | Merker et al. | 248/49 |
| 3,233,850 | 2/1966 | Merker et al. | 191/12 C |
| 3,284,036 | 11/1966 | Nansel | 248/49 |
| 3,332,434 | 7/1967 | Stahmer | 191/12 C |
| 3,337,696 | 8/1967 | Waninger et al. | 191/12 C |
| 3,381,705 | 5/1968 | Murphy | 137/355.28 |
| 3,396,747 | 8/1968 | Moore | 137/355.21 |

Primary Examiner—Samuel Scott
Attorney—Burton and Parker

ABSTRACT: This disclosure relates to a rolling conductor support useful in supporting, guiding and protecting electrical, hydraulic, coolant and the like conductors extending between parts of machines which move relative to one another on guides or tracks. The conductor support comprises a plurality of parallel chains connected in laterally spaced relation by conductor-supporting bridges to which the conductors are fastened by clips or retainer loops. The chains are composed of links pivotally connected at overlapping contiguous ends, with an arcuate slot in one end of each link receiving a stop pin in the overlapping contiguous end of the next link, with the length of the slots determining the bending radius of the chains.

The disclosure also encompasses two or more conductor supports arranged in stacked relation with means for supporting one on top of the other in spaced-apart relation.

Also disclosed is a flexible, sheetlike member extending between the chains to form a protective covering for the conductors, with retention bars overlying the cover and releasably engaged with the chain links. There is further disclosed a support including cross members extending between the chains forming a platform on which an operator may stand, with the chain links formed with laterally extending flanges to which the cross members are connected.

INVENTOR.
GORDON H. CORK
BY
Burton & Parker
ATTORNEYS

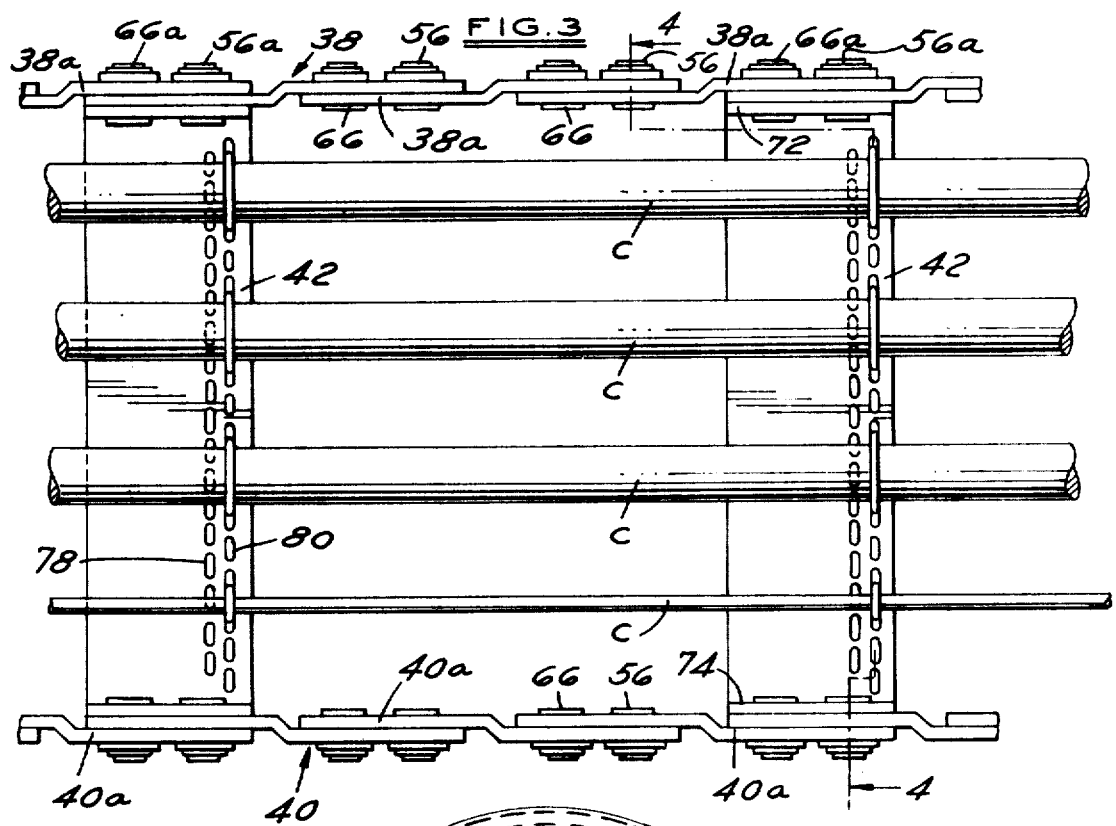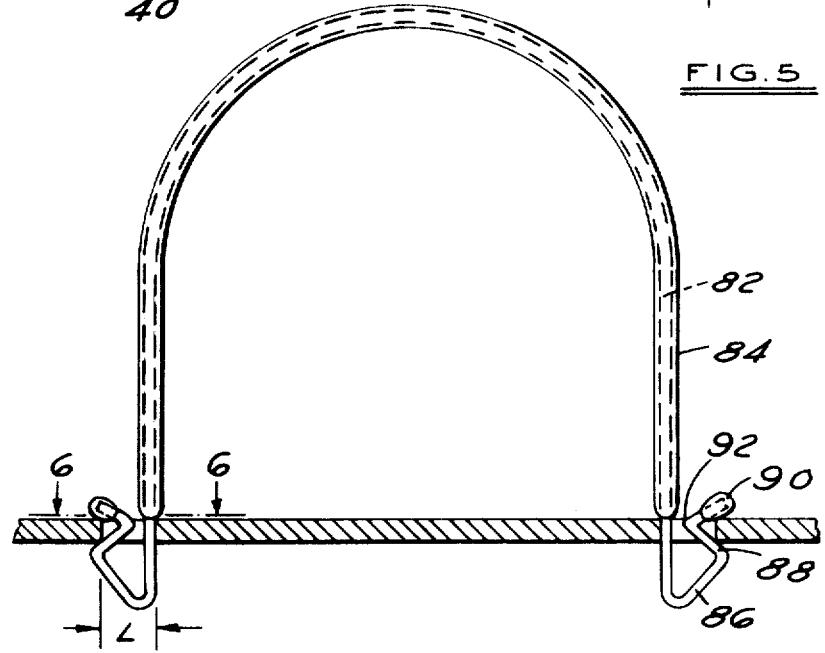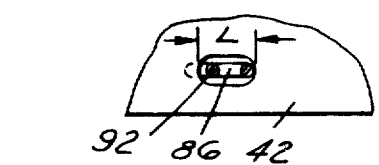

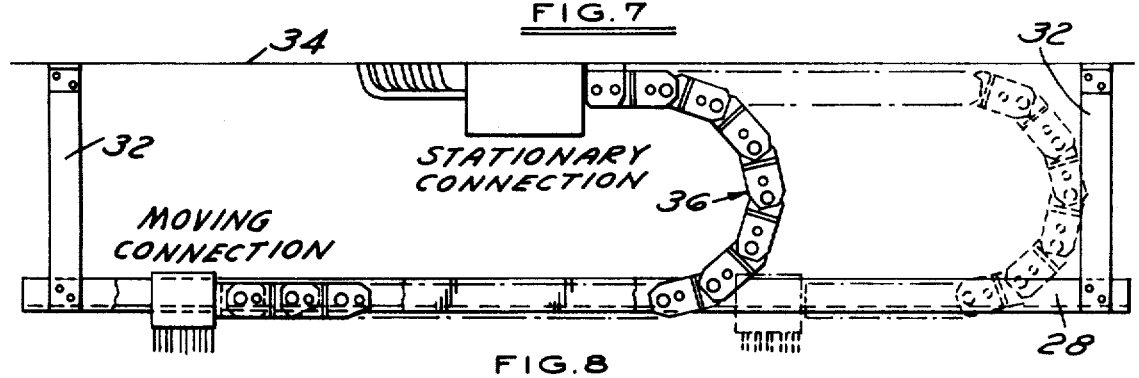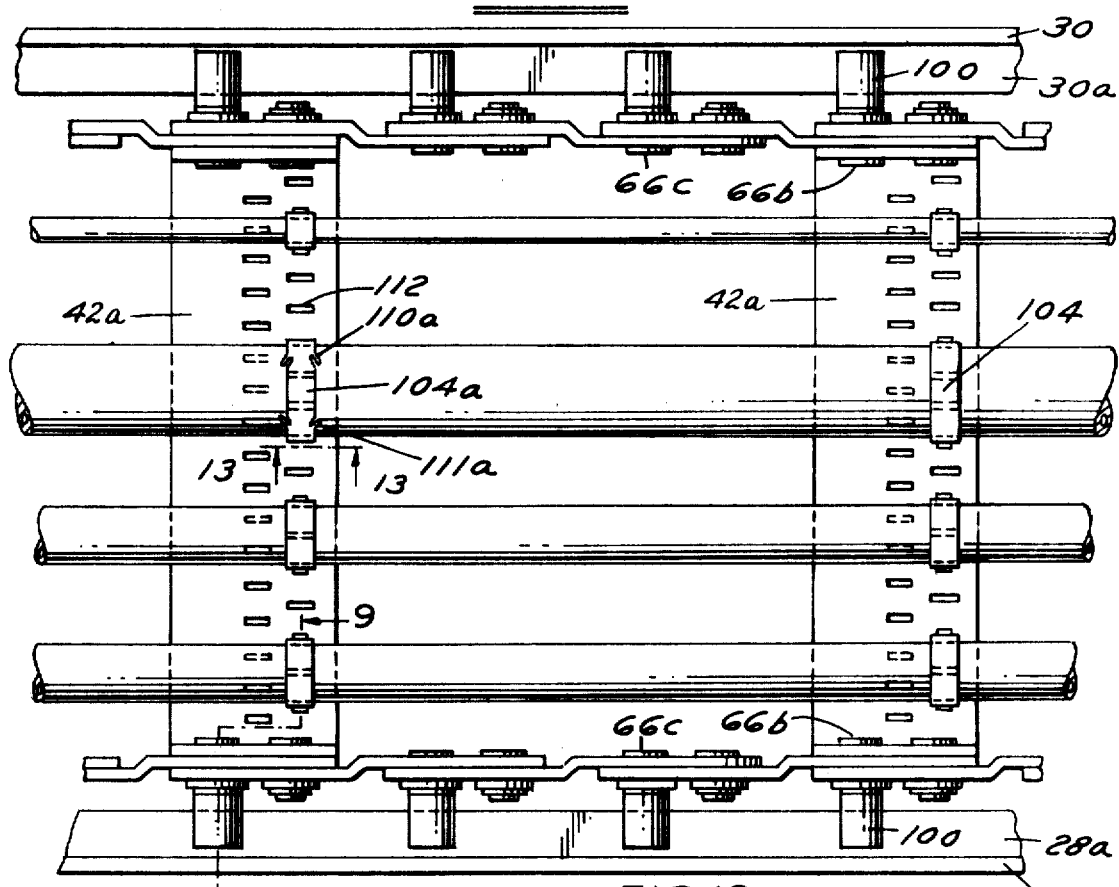

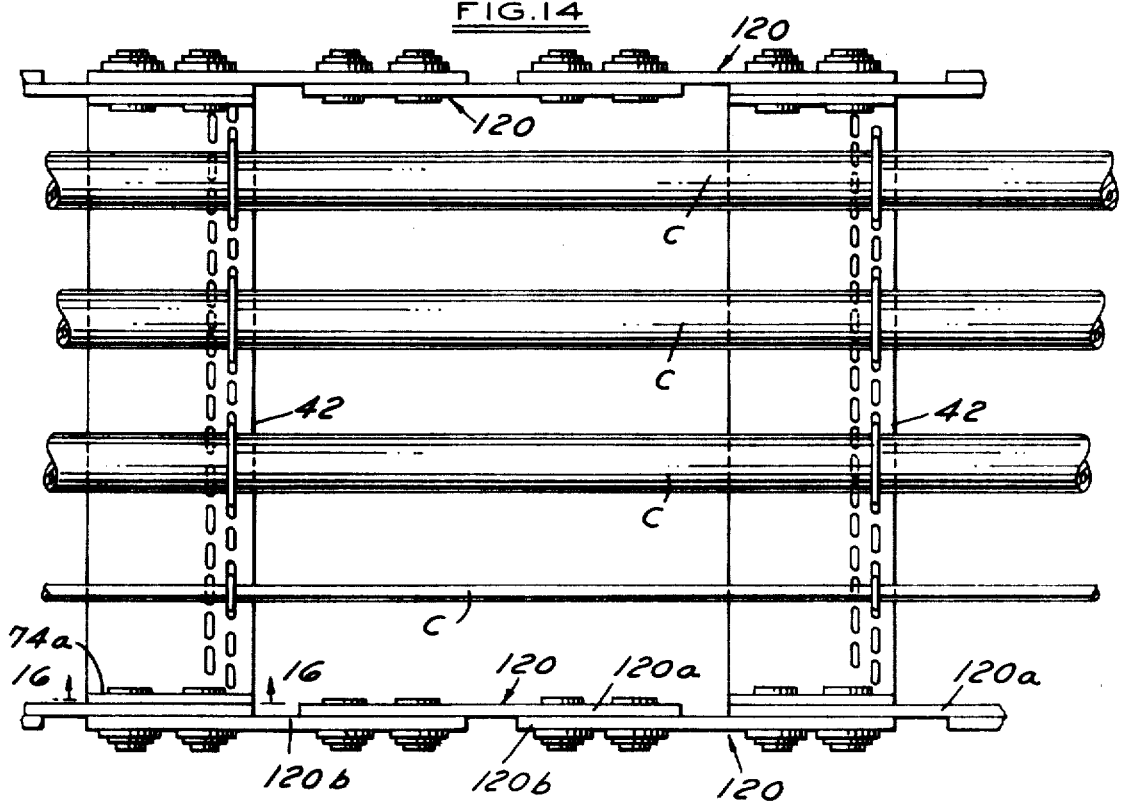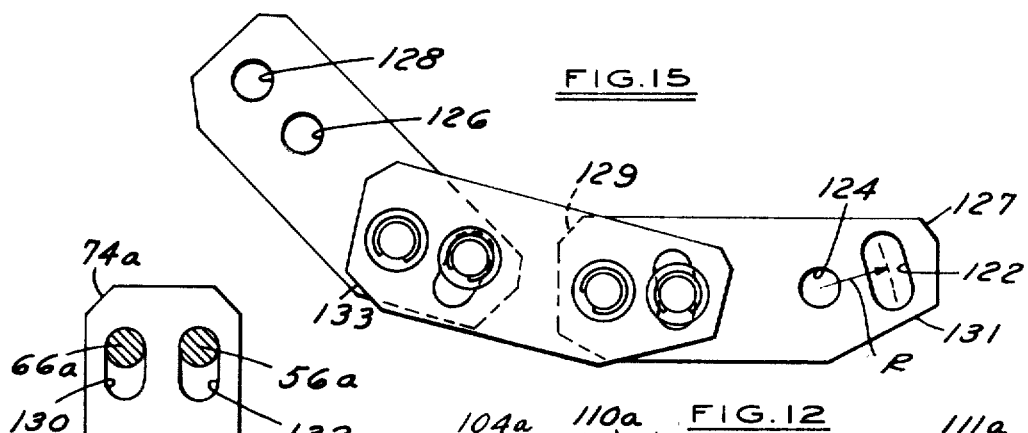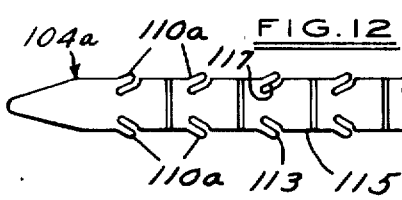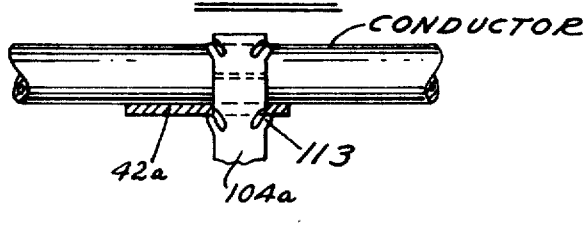

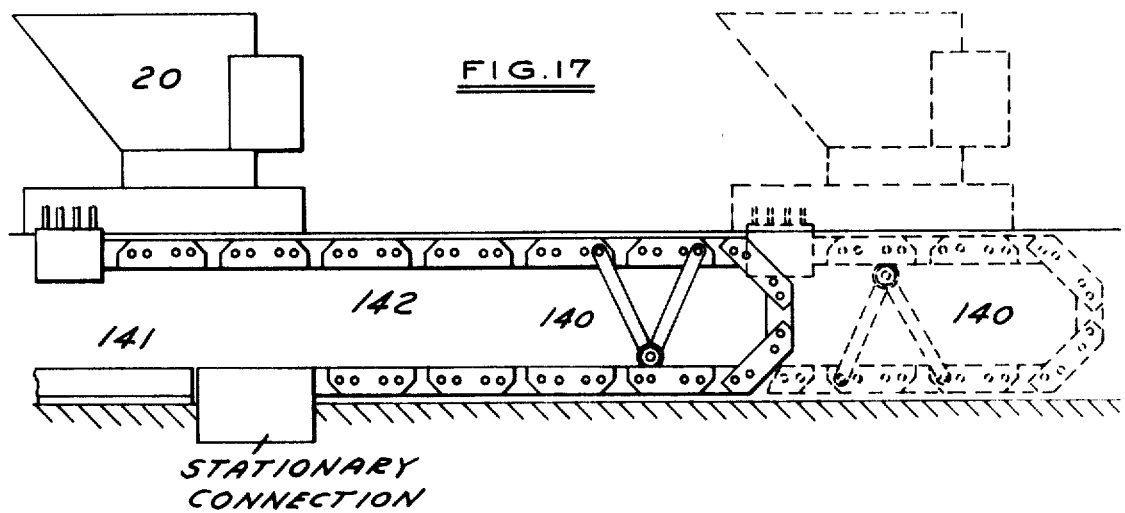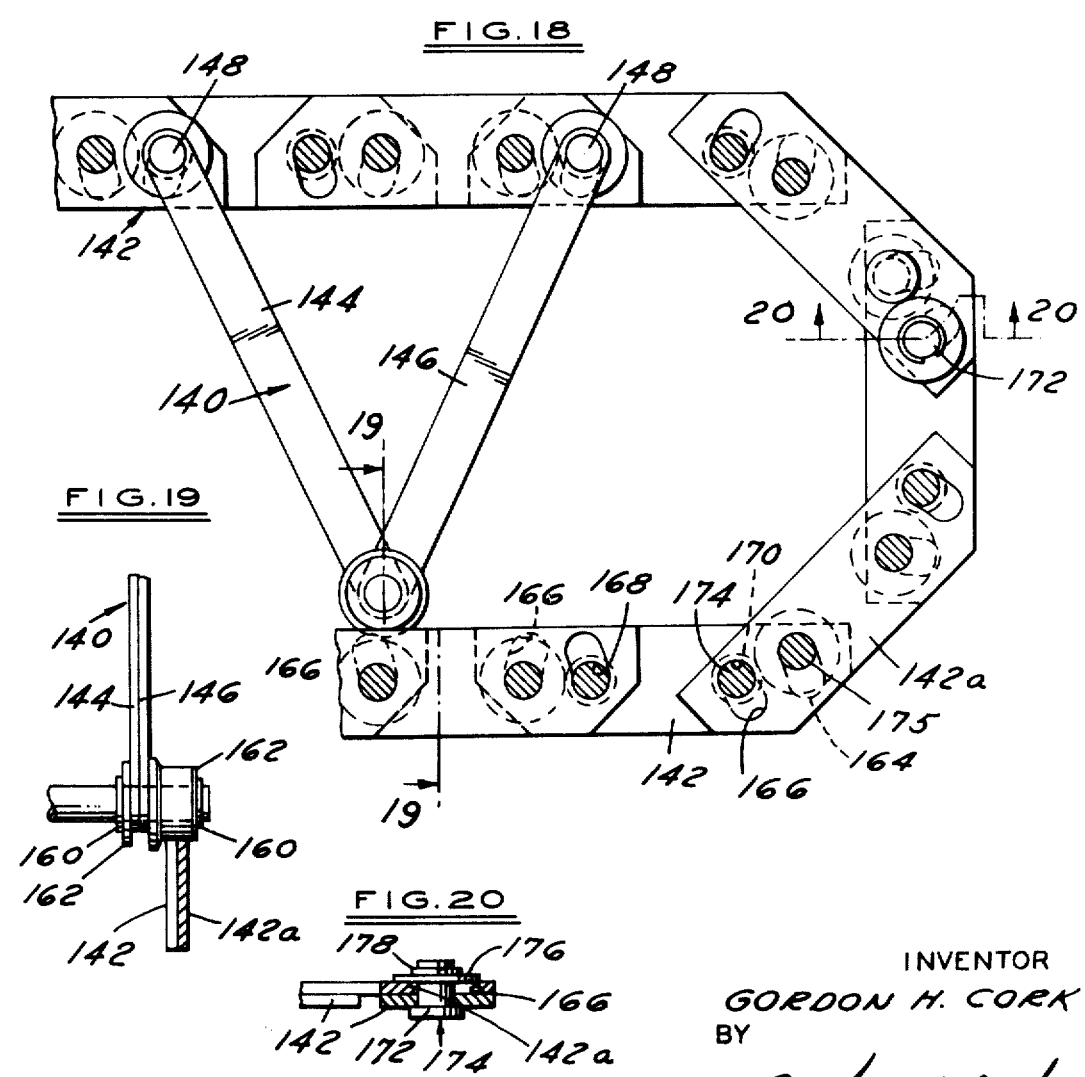

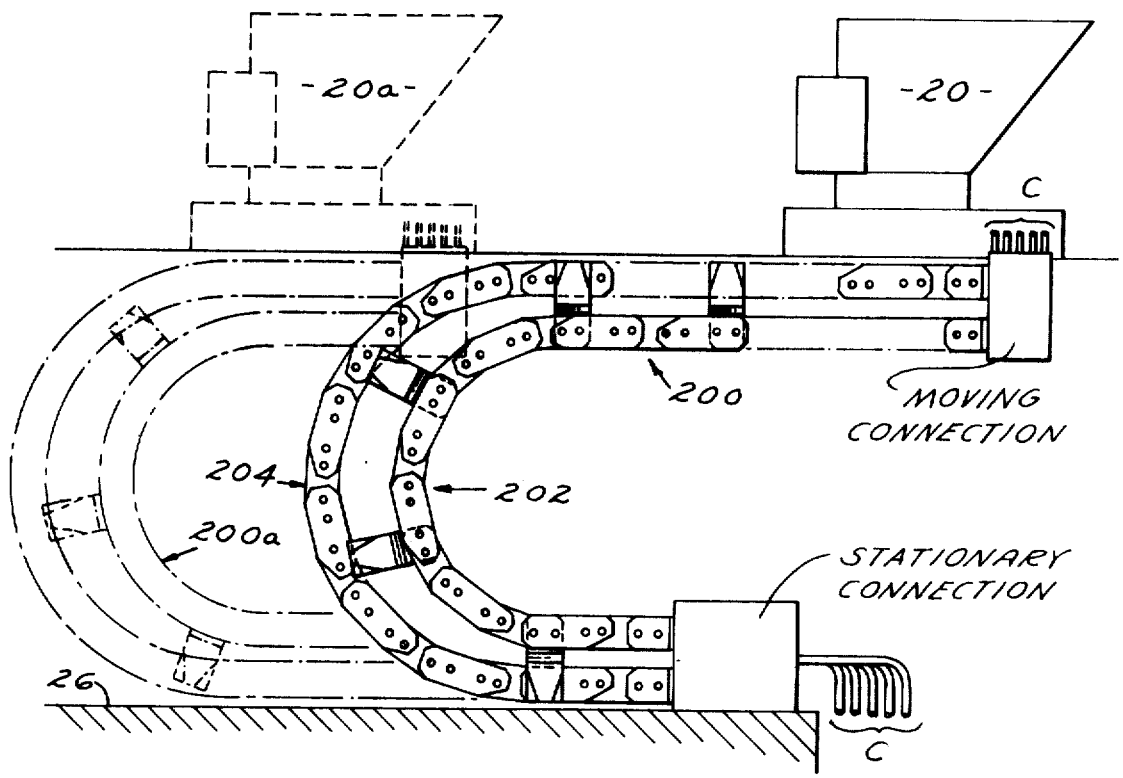
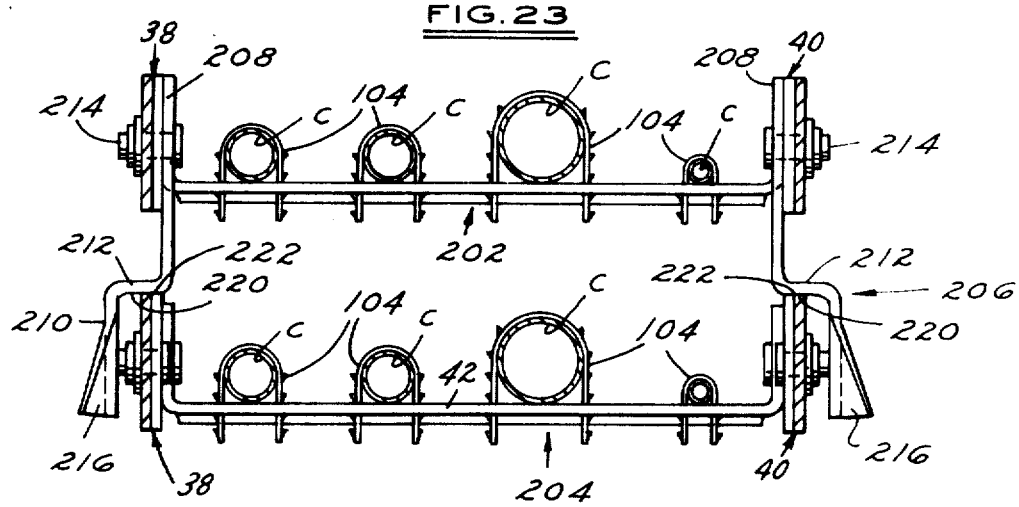

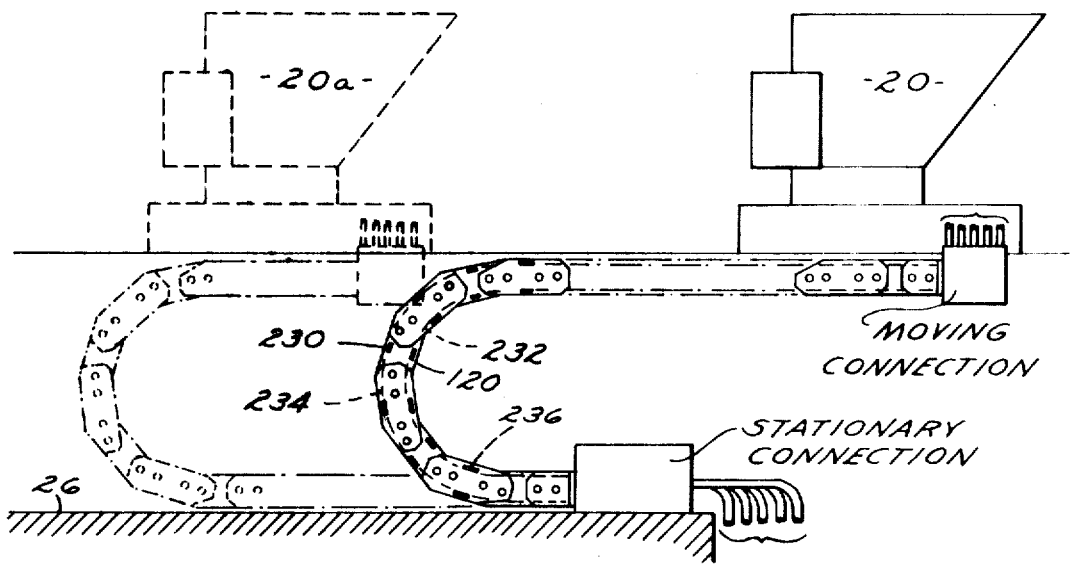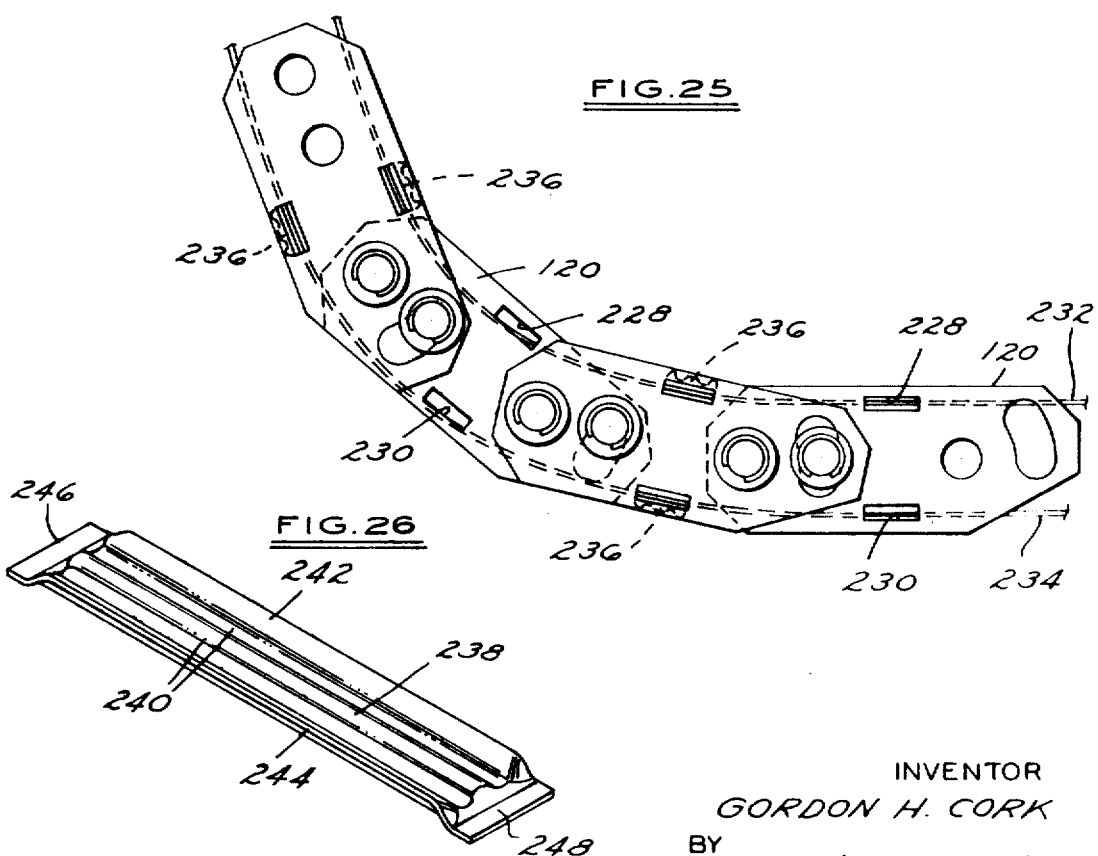

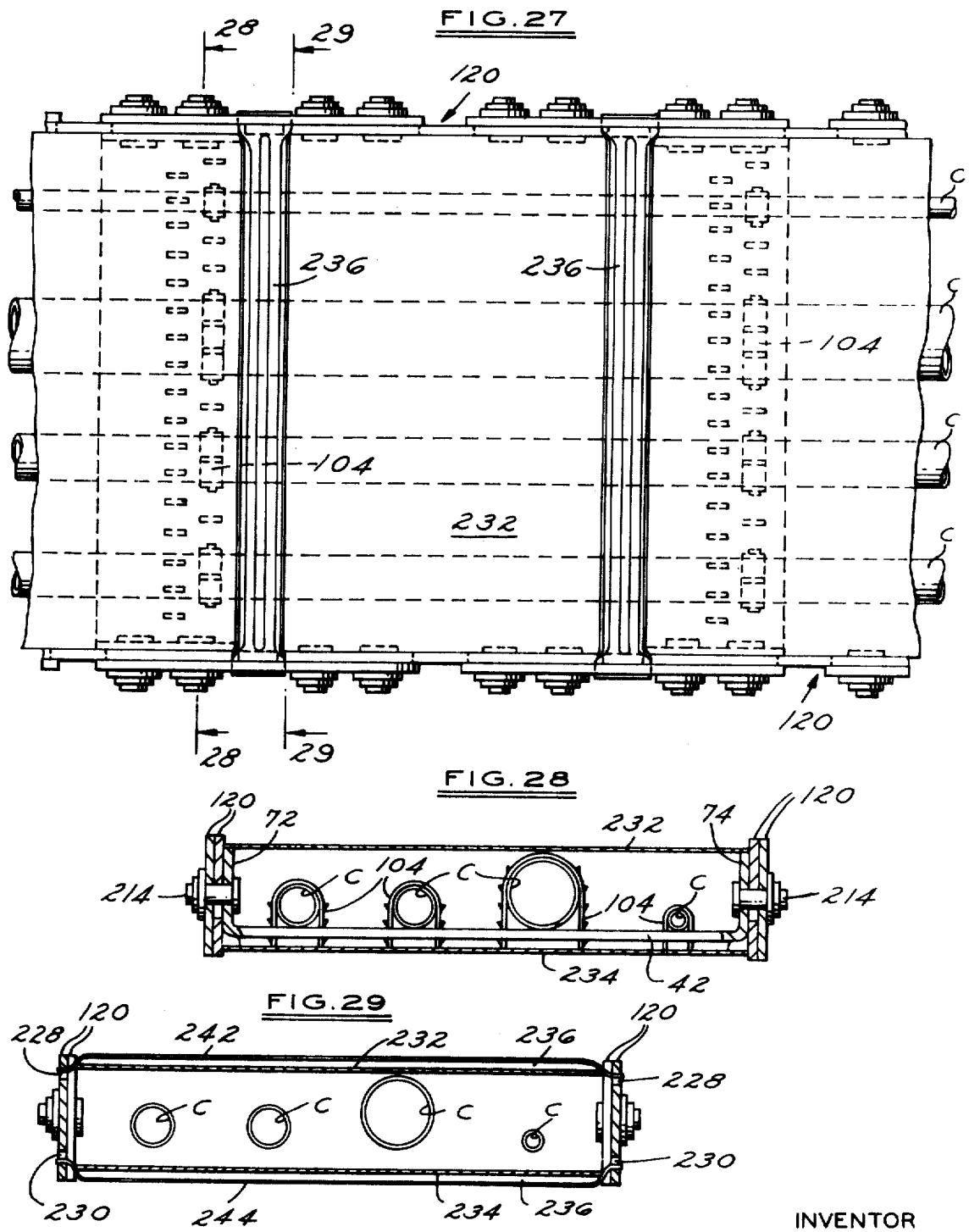

INVENTOR
GORDON H. CORK
BY
Burton & Parker
ATTORNEYS

ROLLING CONDUCTOR SUPPORT

This application is a continuation-in-part of my copending application Ser. No. 670,646, filed Sept. 26, 1967 and now abandoned. This invention relates to improvements in rolling conductor supports of the general type shown in U.S. Pat. Nos. 2,864,907; 2,975,807; 3,053,358 and others where the object is to support, guide and protect electric hydraulic, pneumatic, coolant and the like conductors which extend between parts of machines that move relative to each other on guides or tracks.

A primary object is to provide a rolling conductor support of simple, foolproof design, which positively controls the radius of its rolling bend without subjecting the operator to the danger inherent in prior-art designs, of catching his clothing or limbs in the moving conductor support, and in particular the chains thereof.

Another object of the invention is to provide a rolling conductor support which will readily accommodate varying diameter conductors without the necessity, inherent in prior-art designs of substantial alteration or modification of the support. Also the conductors may be mounted on the rolling support without the necessity of threading the conductor through apertures in the bridges, as required in prior-art designs.

Another object of the invention is to provide a rolling conductor support so designed that it may be fabricated in varying widths using various multiples and/or multiple sizes of its components.

A further object is the provision of a rolling conductor support having flexible conductor-covering means protecting the conductors from dirt, foreign objects, and the like, and in addition preventing material such as workmen's clothing becoming caught up in the support.

Another object is the provision of a conductor support of the character described including platform means capable of carrying a workman or machine operator.

A further object of the invention is to provide a rolling conductor support system comprising two or more support means in stacked relation with arms extending between adjacent supports to maintain the same in spaced apart relation.

Still other objects of the invention include compactness of design, low maintenance, and low cost.

Other objects, advantages, and meritorious features will become more fully apparent from the following specification, claims, and accompanying drawings, wherein:

FIG. 3 is a plan view of a portion of a rolling conductor support made according to one embodiment of the invention;

FIG. 5 is an enlarged view of one of the conductor retaining clips of FIGS. 3 and 4 mounted on a bridge;

FIG. 6 is a cross-sectional view taken on line 6-6 of FIG. 5;

FIG. 7 is a side elevation of a rolling conductor support utilized in a different application from that of FIG. 1 and showing a suspended track system for supporting the rolling support;

FIG. 8 is a plan view of a portion of the rolling support of FIG. 7;

FIG. 9 is a cross-sectional view taken on line 9-9 of FIG. 8;

FIG. 10 is a plan view of a modified form of conductor retainer;

FIG. 11 is a side elevation of the retainer of FIG. 10;

Figure 1:
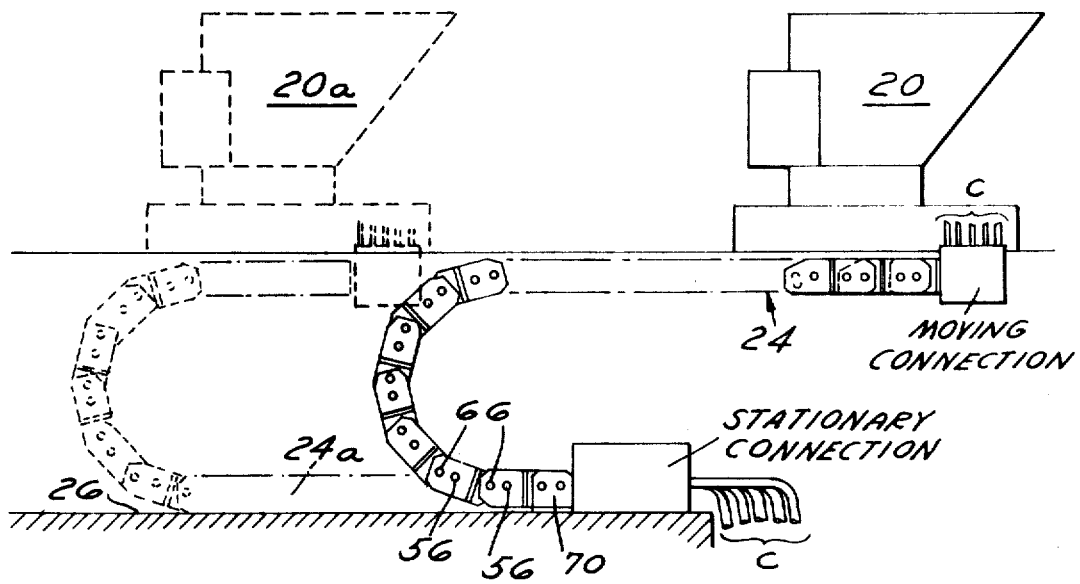
FIG. 1 is a side elevation of a rolling conductor support made according to this invention.
Figure 22:
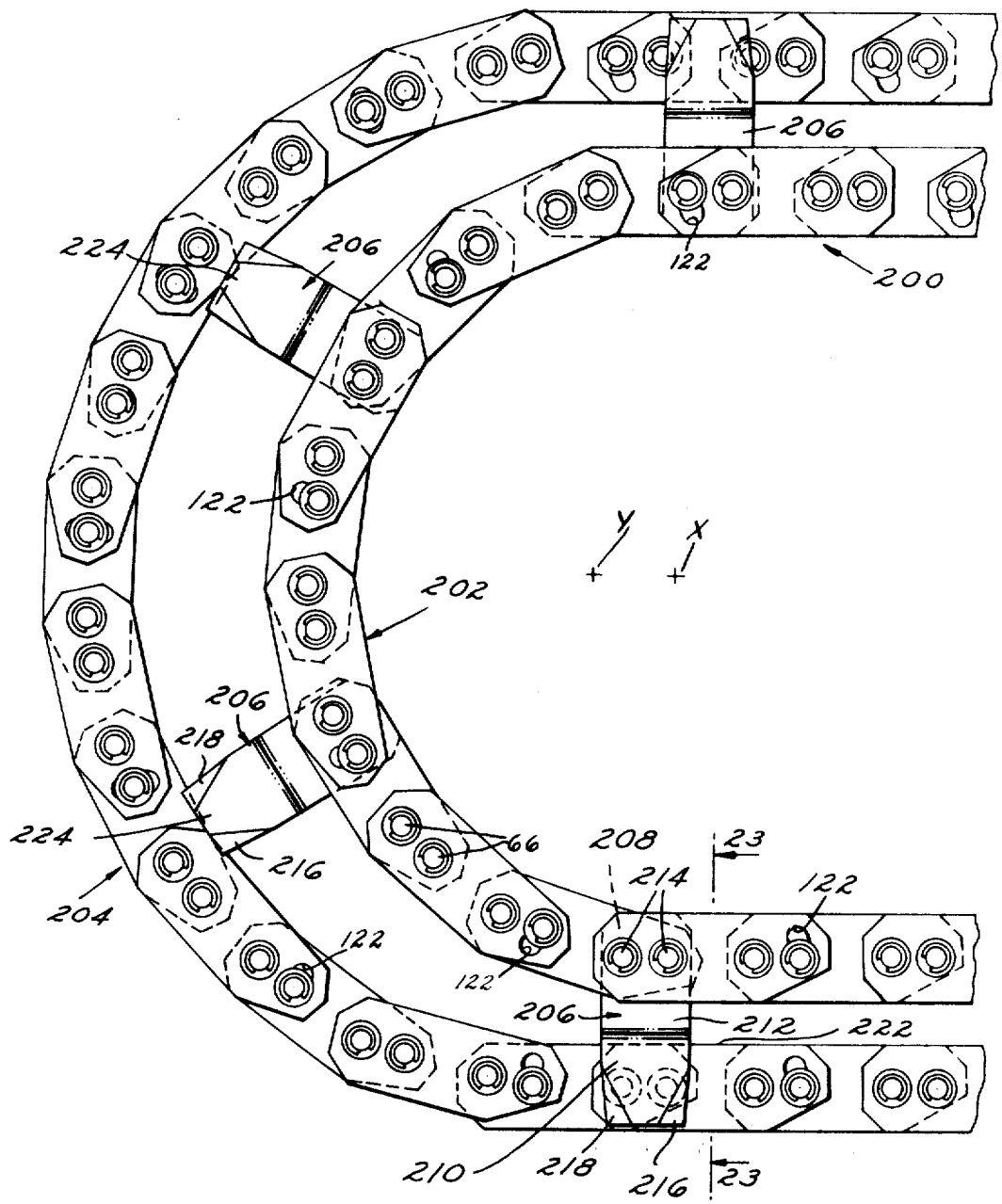
Figure 30:
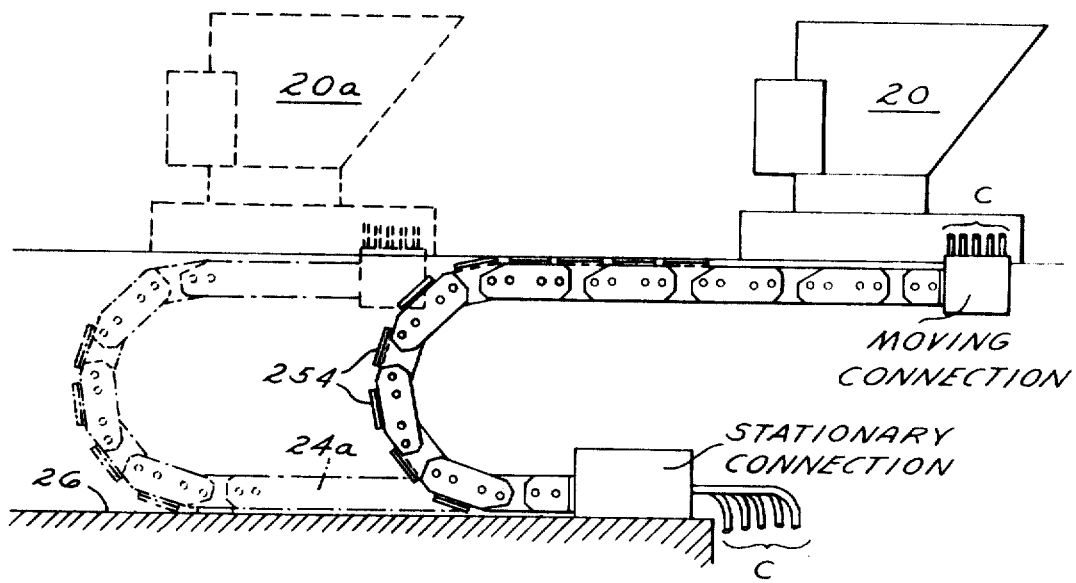
Figure 31:
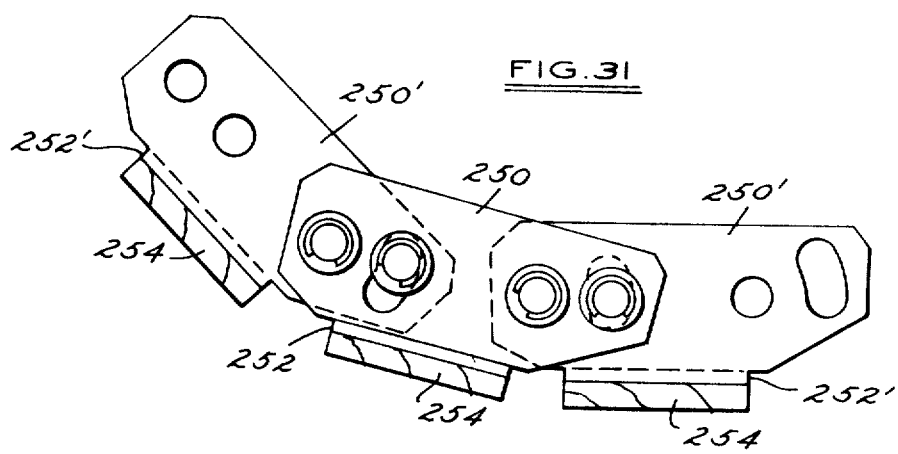
Figure 32:
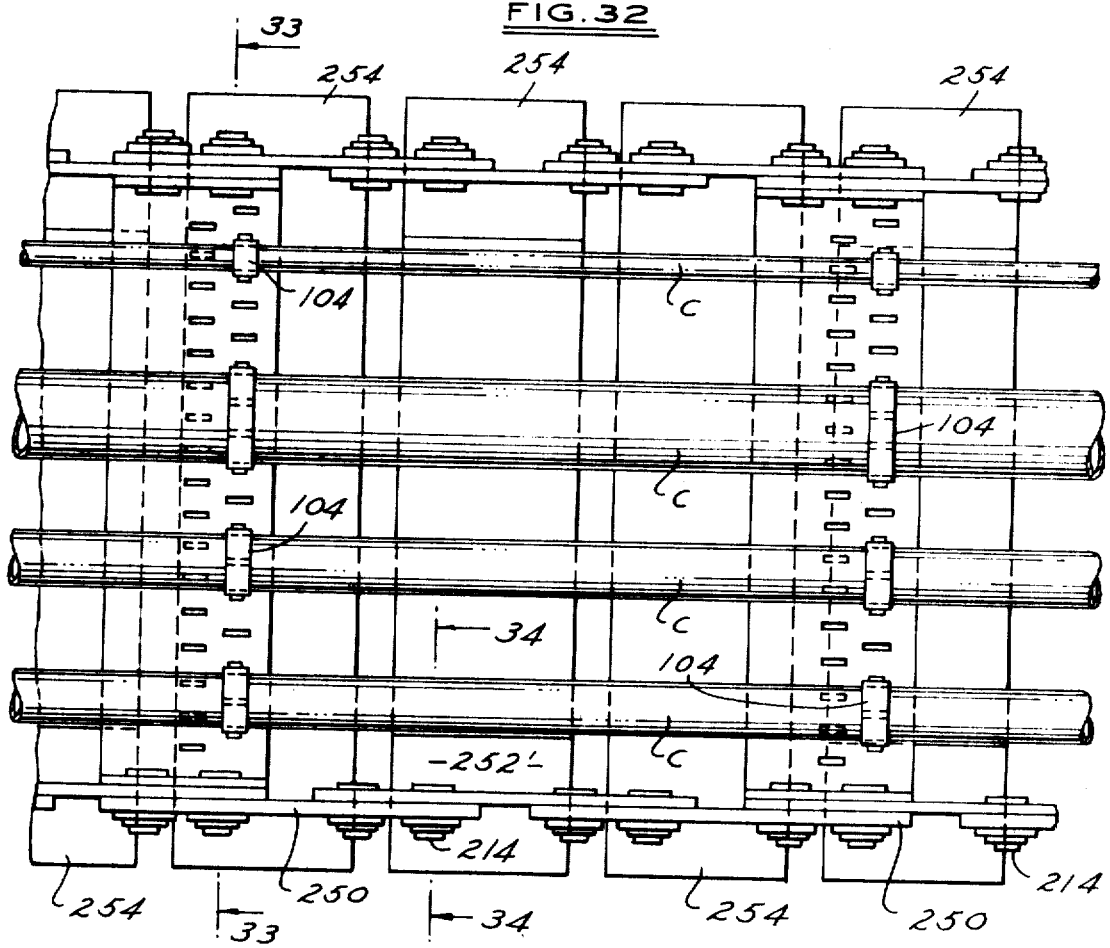
Figure 33:
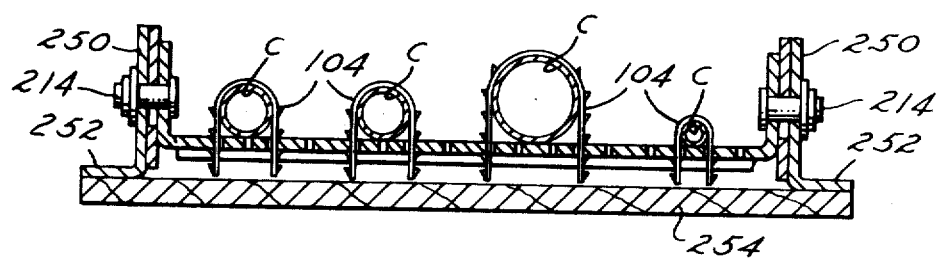

FIG. 12 is a plan view of a portion of another modification of the conductor retainer usable in lieu of the retainer of FIGS. 10 and 11 in the bridges 104 of FIGS. 8 and 9;

FIG. 13 is a cross-sectional view taken on the line 13-13 of FIG. 8;

FIG. 14 is a plan view of a portion of a modified form of rolling conductor support;

FIG. 15 is a side elevation of three links of one of the side chains of the support of FIG. 14;

FIG. 16 is an end elevation of a modified form of a bridge taken on the lines 16-16 of FIG. 14;

FIG. 17 is a side elevation of a rolling conductor support utilizing a travelling-V support;

FIG. 18 is a side elevation of six links having radius limiting slots in opposite ends;

FIG. 19 is a cross-sectional view through the rolling conductor support of FIG. 17;

FIG. 20 is a cross-sectional view taken on line 20-20 of FIG. 17;

FIG. 21 is a side elevation similar to FIG. 1 of a pair of rolling conductor supports arranged in stacked relation;

FIG. 22 is an enlarged side elevation of one of the chains of each of the rolling conductor supports shown in FIG. 21;

FIG. 23 is a cross-sectional view taken on the line 23-23 of FIG. 22;

FIG. 24 is a side elevation similar to FIG. 1 showing a rolling conductor support having flexible protective covers for the conductors and retaining means for the covers;

FIG. 25 is an enlarged side elevation of the support of FIG. 24;

FIG. 26 is a perspective view of one of the retaining means for the covers of FIGS. 24 and 25;

FIG. 27 is a plan view of a portion of the support of FIG. 24;

FIGS. 28 and 29 are cross-sectional views taken on the lines 28-28 and 29-29 respectively of FIG. 27;

FIG. 30 is a side elevation similar to FIG. 1 showing a modified rolling conductor support having platform means incorporated therein;

FIG. 31 is a detail of three links of one of the chains of the rolling conductor support and platform of FIG. 32 is a plan view of a portion of the support shown in FIG. 30;

FIG. 33 is a cross-sectional view taken on line 33-33 of FIG. 32; and

Figure 34:
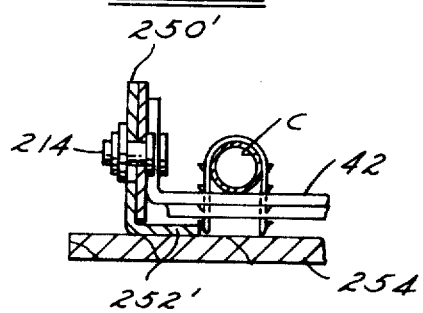

FIG. 34 is a partial cross-sectional view taken on line 34-34 of FIG. 32.

In FIGS. 1 and 7 are shown two representative installations for the rolling conductor support. Each shows a stationary connection and a moving connection. In FIG. 1 the moving connection is part of a moving machine element 20 that traverses rectilinearly above the stationary connection between the solid and phantom outline position 20a. As part 20 moves the rolling conductor support 24 moves with it as shown in the phantom and solid outline positions. The conductor support carries the conductors C which extend between the moving and stationary connections. In the phantom outline position of FIG. 1 the conductor support portion 24a, may roll out and rest upon the floor or some other support 26, though if maximum travel of the moving connection be not too great, no support 26 beneath the portion 24a is required.

In FIG. 7 the moving connection traverses beneath the stationary connection between the solid and phantom outline positions. In this instance a pair of angle iron tracks 28 and 30 are shown suspended by suitable hangers 32 from the ceiling 34, and the rolling conductor support 36 lays out on and is supported by the tracks as the moving connection traverses. Except as hereinafter mentioned, the conductor support 24, of FIG. 1 is constructed the same as that shown at 36 in FIG. 7.

Figure 2:
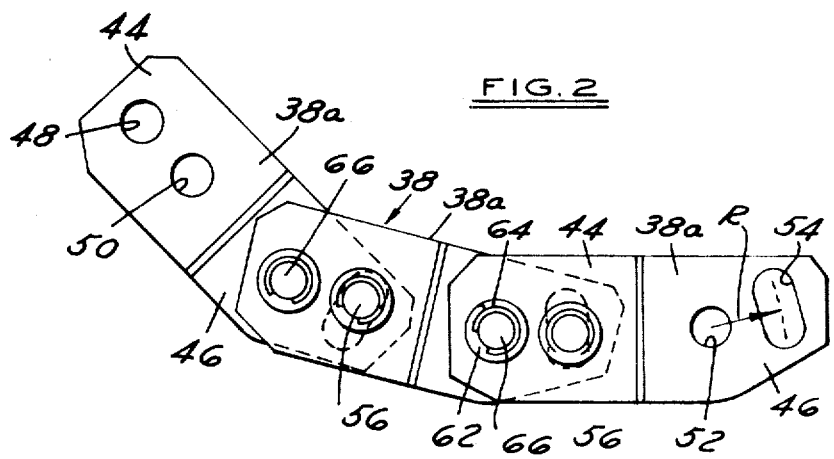
FIG. 2 is a detail of three links of one of the chains of the rolling conductor support made according to this invention.
Figure 4:
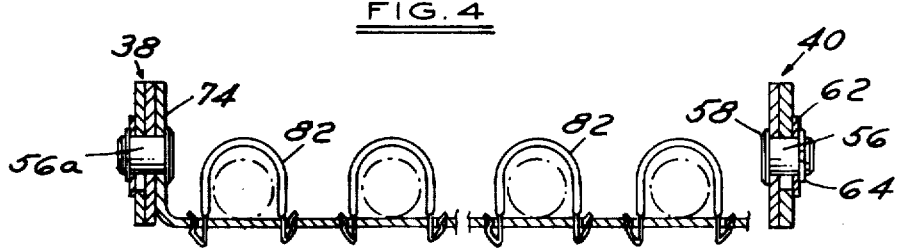
FIG. 4 is a cross-sectional view taken on the line 4-4 of FIG. 3.

Referring now to FIGS. 2, 3 and 4, the rolling conductor support comprises a plurality of chains 38 and 40. In the illustrated embodiment two chains are shown though it will be apparent that three or more might be provided. The chains are connected together in laterally spaced relation, as shown in FIG. 3, by a plurality of transversely extending conductor supporting bridges 42. The bridges are arranged in spaced-apart relation along the length of the chain. Though only two bridges are shown, it will be understood that a sufficient number are provided to adequately carry the conductors, for example, a bridge may be provided at every third chain link.

Each chain comprises a succession of identical links, the links of chain 38 being indicated by 38a, and those of chain 40 by numeral 40a. The links 38a, are allochiral with respect to links 40a. Therefore a description of the links 38a, will suffice for both chains.

As shown in FIGS. 2 and 3 each link comprises a generally planar plate whose opposite ends 44 and 46 are offset from one another by substantially the thickness of the plate. As a consequence of this offset the links may have their contiguous ends overlap as shown with the resulting chain lying substantially in a plane. The profile of each link is clearly shown in FIG. 2. The corners are beveled as shown and four apertures extend through each link, two in each end portion. In portion 44 the apertures are circular holes 48 and 50, which lie on the profile centerline of the link, while in end portion 46, the apertures comprise a circular hole 52 and an arcuate slot 54. The arc of the slot is drawn from the center of hole 52, and the arcuate length of the slot determines and positively limits the curvature of the chain as the conductor support bends in its movement with the moving connection.

The overlapping contiguous ends of the links are pivotally connected together as shown in FIGS. 2, 3 and 4. That end of each link opposite the end having the slot is provided with a laterally projecting pivot part 56 which extends into the slot and limits the swinging movement between the links. Pivot parts 56 are identical and each comprises a pin having head or retainer portions 58 and 60 at opposite ends. Portion 58 is a head integral with the pin, while portion 60 may be a composite comprising a washer 62 and a snapring 64 received in a groove adjacent the end of the pin. Obviously the pin could be in the form of a rivet if desired. It will be noted that head portion 60 overlies the face of the link, adjacent the slot, opposite the contiguous end of the other link, whereby the pin aids to retain the links against lateral separation.

The contiguous ends of the links are pivotally connected by pins 66 which are in all respects similar to pins 56 heretofore described, including the head portions thereof. They have been given different reference numerals in the drawings to distinguish between pivot points, at 66, and radius control points, at 56.

It will now be apparent from a study of FIG. 2 that the permitted swing of successive links, and in turn the bending radius of the rolling conductor support, will be determined by the amount of movement afforded the radius control points 56 and this is determined by the arcuate length of the slot 54. Obviously it is possible to provide links having varying slot lengths and thereby vary the radius of the chain curve, and such is contemplated in actual practice. Except for the length of the slot the links may be identical. This leads to substantial economy in manufacture of chains to meet various customer requirements. Of course, all links of any given chain would normally have the same slot length unless special circumstances dictated that in a given chain slots of certain links should have one length and those of other links another length. Such would be unusual.

Opposite ends of each chain may be secured to its respective stationary or moving connection by an angle bracket 70 as shown in FIG. 1. Special mounting brackets for opposite ends of the the chains may be provided if desired.

The chains are connected together by the transverse or laterally extending conductor-supporting means comprising bridges 42, each of which is anchored at opposite ends at two points to its confronting links. As shown in FIGS. 3 and 4, each bridge comprises a plate having upturned ends 72 and 74, each of which is provided with a pair of circular apertures, which register with a pivot point and a radius-limiting point. Pins 56a and 66a slightly longer than pins 56 and 66, but otherwise of identical construction, are extended through the aligned apertures of the bridge ends and the links. Each bridge therefore pivots about the pins 66a and swings with the stop pin or laterally projecting member 56a to smoothly follow the curvature of the conductor support. Each bridge is therefore connected by the pins to successive links to pivot with the swinging motion between them.

The bridges shown in FIGS. 3 and 4 are each provided with two staggered rows of spaced-apart clip- or retainer-receiving apertures 78 and 80. The apertures bracket the conductors C laid on the bridges. The staggered arrangement of the rows insures that there will be a pair of apertures closely bracketing any size or location of conductor on the bridge. The conductors are then retained on the bridge by spring clips 82 having resilient end portions extended through the apertures and locked therein against withdrawal by the conductor. The clips or retainers may comprise a wire coated with a phenolic resin or other wear-inhibiting insulating coating 84. The ends of the retainer may be folded upon themselves as shown to provide a tapered portion 86, an upwardly facing locking portion 88 and a stop 90. The length L of the slot is sufficiently short in relation to the length of the locking face 88 and the thickness of the wire that even if a strong outward pull is exerted on the clip by the conductor, the clip will not pull out as bend 92 will engage the standing portion of the wire clip and limit movement of the locking face in an unlocking direction. In order to insert the folded ends of the clip through the apertures, bend 92 must be caused to bypass the standing portion of the clip. This locking feature therefore assures that once the conductors have been anchored by the retainers, they will not be unintentionally dislodged from the bridges.

In practice the conductors are laid out along the bridges in suitable laterally spaced relation and then the clips are inserted through the apertures bracketing the conductors. This manner of retaining the conductors obviates the difficulties in the prior art wherein the conductors had to be threaded through holes in the bridges.

In FIGS. 7—11 the rolling conductor support is in all respects of similar construction to that heretofore described except in the following particulars. In order to support the rolling support on the tracks 28 and 30, the pivot pins 66 are of increased length and a roller 100 is mounted on the projecting end and retained in any suitable fashion. Such pins are indicated at 66b and 66c. The rollers ride the horizontal surfaces 28a and 30a of the tracks.

The conductor retainers are also of a somewhat different design, as are the apertures through the bridges numeral 42a. The retainer loops are in the form of plastic straps 104, such as nylon straps, and opposite end portions 106 and 108 are provided with a plurality of angularly projecting tabs 110 and 111. The tabs are formed by U-shaped slits in the strap with the tabs bent angularly out of the plane of the strap. The nylon selected should be sufficiently resilient so that the tabs will depress upon the ends of the straps being pushed through provided slots in the bridge. Preferably the tabs in one end portion of the strap, such as tabs 110, should be slightly closer together than the tabs 111 in the other end portion to allow for closer adjustment of the strap to the size of the conductor.

Slots 112, arranged in staggered rows, are provided in the bridges. The slots are slightly oversize the planar thickness of the end portions of the straps such that the tabs 110 and 111 will, after the end portions have been inserted through the slots, retain the straps against withdrawal. The rows are staggered for the same purpose as the stagger of the apertures in the bridges of FIGS. 3—6. As the end portions of the straps are pushed through the slots the tabs deflect to allow passage, and then spring out to engage and lock the straps and associated conductor in place. Unduly long projections of the strap beneath the bridges may be cut off. This strap, in addition to providing a broader load-bearing area against the conductors than the clips of FIGS. 4—6, lends itself to readily accommodate a wide variety of conductor diameters.

It will be noted from the foregoing that as the links of the chain pivot there is no exposed alligator jaw effect which can catch an operator's clothing or limbs. Also it will be noted that the rolling conductor support will accommodate a wide variety of varying diameter conductors. In the case of the clips 82 various size clips may be provided to accommodate varying size conductors without any changes in the bridges. In the clips or retainers of FIGS. 7—11 the straps may accommodate any size conductor simply by pushing the ends of the straps through the bridges to the extent required and any excess can then be simply cut off.

It will also be apparent that the bridges may be made according to the design herein disclosed in varying lengths (measured transversely of the chains) to provide rolling supports of varying width. Also, three or more chains may be provided in a rolling support simply by providing pivot and stop pins 56a and 66a of sufficient length to accommodate a bridge on each side of what would become an intermediate chain. Other modifications will be apparent to those skilled in the art.

In FIGS. 12 and 13 a further modification of the conductor retainers is shown. Each retainer comprises a strap or strip 104a of a somewhat resilient plastic shaped to provide along linear margins, or marginal edges 115, a succession of angularly outwardly extending tabs or ears 110a and 111a disposed at an acute angle with respect to the linear edges of the strap and resiliently connected thereto to deflect inwardly to allow each strap to be inserted through slots 112 in the bridges and be locked therein by the tabs as shown in FIG. 13. In FIG. 8 one of these modified straps is shown.

The strap may be formed of nylon or other suitable plastic. It is intended to be used in lieu of the straps 104 heretofore described. The ears or tabs face in opposite directions in the opposite end portions of the strap, thus ears 110a face oppositely to ears 111a. Tabs 111a may be slightly closer together, measured along the length of the strip than tabs 110a, to permit more accurate sizing of the strap to different diameter conductors.

Each of the tabs or ears 110a and 111a has a distal end 113 which normally lies beyond the adjacent linear edge 115 of the strap to thus underlie the bridge as shown in FIG. 13 and prevent withdrawal of the strap. From such distal end back to the point of joinder of the tab with the body of the strap, the tab is separated from the body by the notch or slot 117 which is of sufficient width to allow the tab to be pressed laterally inwardly (in the plane of the strap) to enable the tabs to pass through the slots 112 of the bridge 104. As the strap is pushed down through the slots, the ears are cammed inwardly by the edges of the slots to allow them to pass therethrough, and after passage through the slots the ears spring outwardly to the position shown in FIG. 13 to underlie the bridge and prevent withdrawal of the strap.

In FIGS. 14 and 15 a further modification of the rolling conductor support is shown as comprising identical chains having identical flat links 120. The advantage of this type of link over the offset links previously described is that it enables the rolling conductor support to be fabricated without the use of right-hand and left-hand links for the chains at the right-hand and left-hand sides of the support. This in turn reduces tooling costs for making the links and simplifies assembly. The hole layout of the flat links is the same as for the offset links, i.e. an arcuate slot 122, formed on a radius R whose center is at the center of pivot hole 124, is disposed at one end of each link for limiting the angle of bending of the chain, and three longitudinally aligned holes 124, 126 and 128 disposed as shown in FIG. 15, complete the layout. The links are connected so that successive links overlap in a regular pattern of inside-outside-inside links, respectively 120a, 120b, 120a, or in other words, successive links overlap on the same side, rather than on the opposite sides as were the offset links.

The upper corners 127 and 129 of these links are beveled as shown in FIG. 15 similar to the offset links. This beveling serves to eliminate sharp corners. The lower corners of each link are beveled as at 131 and 133. This latter beveling serves to eliminate projecting corners which would engage the floor 26 (FIG. 1) and tend to cause the chain to "walk" therealong as the rolling conductor support at its point of contact with the floor moves with the moving connection.

FIG. 16 shows a modification of the conductor supporting bridges. By making the apertures in the upturned ends 72 and 74 of each bridge vertically oblong, as at 130 and 132, the bridge is allowed to float slightly which is advantageous as the conductor support rolls with movement of the moving connection. The floating permits the bridge to shift or "come and go" and thereby adapt itself to the bending of the conductors supported on it. While this modification of the bridge is shown in connection with a conductor support having flat identical links, it is obvious the floating bridges may be used with the rolling conductor supports having the offset links.

FIGS. 17—20 show a rolling conductor support embodying further modifications. First, an intermediate spacer 140 or what may be termed a travelling-V spacer, is mounted on the rolling conductor support to move with it and support the upper span 142. The travelling-V is useful where the moving connection moves a distance such that a substantial length of the rolling conductor support must be self-supported, or where the weight of the conductors is such that an intermediate support is desirable. The second modification relates to the provision of arcuate slots at opposite ends of each link allowing a sharper turning radius for the rolling conductor support without increasing the height of the links.

Considering first the travelling-V spacer, it comprises at each side of the rolling conductor support a pair of arms 144 and 146 connected at one end to the pins 148 of the chains, and at the opposite ends connected to an axle 150. Flanged wheels 152 and 154 on the axle are adapted to ride the lower span 156 of the rolling conductor support. The axle may be provided with snaprings 160 and washers 162 for retaining the wheels and arms 144 and 146 at each end of the axle. The effective length of the arms 144 and 146 is such that the flanged wheels 152 and 154 roll along the lower span of the chain and support the upper span, as shown in solid outline in FIG. 17, or ride the upper span to support it, as shown in phantom outline. The travelling-V spacer moves with the support around the bend connecting the spans and may be used where either the upper or lower span is connected to the moving machine element. In the event the lower span is connected to the moving machine element, rollers or the like such as illustrated in FIGS. 7, 8 and 9, should be provided where a travelling-V spacer is utilized. Also, where the relative movement is great, rails such as 141 in FIG. 17, or other suitable supporting surface extending beyond the opposite side of the stationary connection may be provided so that the travelling-V will have a supporting surface to ride.

With respect to the second modification shown in FIGS. 17—20, each link is provided with arcuate slots 164 and 166 at opposite ends, and a pair of pivot pin apertures 168 and 170 therebetween. The arcuate slots are formed on a radius R whose center is at the center of the adjacent pivot pin hole, or the pivot part extending through such hole. In the arrangement of FIG. 18 the chain will make a 180° bend in five links. Each slot is 22½° in effective length. To make the same bend using the links of FIGS. 2 or 15, each slot would have to be 45° in effective length. In order to provide adequate strength for a 45° slot the vertical dimension of the link would have to be greater than if two 22½° slots are provided in opposite ends of each link. As a consequence, the provision of two arcuate slots in each link makes possible sharper bends in the rolling conductor support without increasing the vertical dimension of its links. This is advantageous in certain installations where the vertical distance between the planes of relative movement between the stationary and moving connection is small. The slots of each link serve to limit the pivotal movement of its adjacent connected links by limiting the travel of the pins projecting through the slots. It will be noted that with each arcuate slot or aperture of one link there is associated a circular hole or aperture of an adjacent link with a pin received therethrough. The circular apertures 168 and 170 serve to fix the pivot parts, or pins, and provide a fulcrum point about which the links swing. For example, considering FIG. 18, the overlapping contiguous end portions of links 142 and 142a are pivotally connected by the pivot parts or pins 174 and 175 which extend laterally between and connect the overlapping end portions together. In the FIGS. 2 and 15 embodiment one of the pins provided the fulcrum about which the overlapping ends swung, and the slot had an angular length measured in relation to such pin which limited the swing between the links. In the FIG. 18 embodiment both pivot pins in the overlapping ends serve as fulcrums and also cooperate with their respective slots to limit swing between the links.

The pivot parts or pins are shown in FIGS. 18 and 20 as having radially extending retainer portions which completely overlie and conceal the slots to prevent entry of dirt or foreign matter, such as metal chips or the like which would interfere with the action of the swing limiting function of the slots. Such retainer portions may be either the heads 172 of the pins 174 or the washers 176. They are of a sufficiently large diameter to completely cover the arcuate slot through which the pin extends. In FIG. 20 the pin is shown as having an enlarged head 172 which completely overlies the slot. A cross section through a pair of connected links where the washer is sufficiently large to completely overlie the slot is shown in FIG. 20. A snapring 178 holds the pin washer and links together.

In FIGS. 21—23 there is shown what may be termed a double-decker rolling conductor support. FIG. 21 is similar to FIG. 1, and similar parts have been identified with the same numerals. The moving machine element shifts rectilinearly from its position at 20 to its position at 20a as hereinabove described, and the double support shown generally at 200 moves with it as shown to the phantom outline position 200a. It should be pointed out that the relative position of elements could be reversed as shown in FIG. 7 or in any other suitable relationship, and the support 200 would function as well. Only one environment has been shown for simplicity and ease of description.

The double-decker rolling conductor support 200 comprises tow sets of conductor support means 202 and 204, arranged in stacked relation and each comprising a plurality of chains 38 and 40 connected together in laterally spaced relation by a plurality of supporting bridges 42 identically as hereinabove described with respect to the previous FIGS. of the drawings. The chains and bridges forming the two support means 202 and 204 are preferably identical, as can be seen from FIG. 23. Shown in FIGS. 21—23 are chains comprising identical links 120 as described and shown with reference to FIGS. 14 and 15 above, but chains of the type shown in FIG. 2 and 3 for example could have just as well been employed.

In order to maintain the supports 202 and 204 in spaced apart relationship and to ensure lateral alignment therebetween through their length, there are provided at spaced apart intervals a series of lead bearing spacer members 206 which are connected to the chain links of one of the supports and project toward and overlie the links of the other support as shown in FIG. 23 particularly. Each spacer 206 comprises a pair of generally vertically extending planar portions 208 and 210 joined together by a laterally extending intermediate portion 212. Spacer portion 208 is provided with two apertures for registry with the apertures 126 and 128 in the links 120 (see FIG. 15), and is secured to the inwardly facing surface of the link by pivot parts 214 identical to those previously described except that they are of necessity slightly longer to accommodate the thickness of spacer 206.

Portion 210 of the spacer 206 projects into juxtaposition with the chain links of support 204 and as can be seen from FIG. 23, support 204 is embraced between opposed spacers 206, and thus the supports 202 and 204 are maintained in laterally aligned relation throughout their length. Opposite marginal edges of the portion 210 are flared outwardly as shown at 216 and 218 away from the chains so that any slight lateral movement of the support between the spacers 206 will not result in the pivot parts 214 striking against a sharp edge of the spacer portion 210 during relative longitudinal shifting of the supports. The flared skirts or wings 216 and 218 thus serve as guide surfaces for the ends of the pivot parts 214. The intermediate portion 212 of each spacer serves as a load bearing surface supporting the chains one on top of the other in spaced apart relation in those portions which extend parallel to each other, i.e. on the horizontal runs. FIG. 23 shows a surface 220 which in actual operation would be in contact with the upper surfaces 222 of the chain links of the lower support 204, but is shown spaced therefrom for clarity.

The curved portion of the double-decker rolling conductor support 200 is shown in FIG. 22 most clearly. As the links of the various chains comprising conductor supports 202 and 204 are identical, the inner support 202 will have a smaller radius of curvature, which radius will be determined by the length of the link slots 122 in identical fashion to that previously described with reference to the chain links of FIGS. 1 and 7. The radius of curvature of the outer support 204 will be greater, as shown, and its center will lie spaced from the center of support 202, the center for support 202 being indicated at X and the center for support 204 at Y in FIG. 22. As a result, the support 204 will bow outwardly away from support 202 on the curve, and the spacers 206 are thus so dimensioned so that their free ends 224 will in all positions of the support overlie the support 204, permitting some slight misalignment, but maintaining the support 204 within the limits defined by the inner surfaces of the spacer portions 210 (FIG. 23).

As can be seen from FIG. 23, the bridges 42 are apertured for acceptance of the conductor retainers 104 to hold the conductors C on the bridges. However, the bridges 42 and retainers 104 may be constructed as shown in FIGS. 3—6, or the retainers may be of the type shown in FIGS. 12 and 13.

In some environments it may be desirable or even necessary to enclose the rolling conductor supports to prevent foreign matter, debris, etc. from falling onto the support and to ensure against accidental catching of clothing of workmen in the device. FIGS. 24—29 show a structure incorporating covers for the conductor supports.

FIG. 24 is similar to FIG. 1 and shows a rolling conductor support 226 of the same general character as that heretofore described, while FIG. 27 shows a top elevation of such support. The only difference in the parts comprising the support from those previously described is that each link 120 is provided with a pair of longitudinally extending slots 228 and 230 adjacent its upper and lower marginal edges respectively, as shown clearly in FIG. 25. The additions to the structure to enclose the conductors C comprise a pair of flexible, comparatively thin sheet members 232 and 234 and a plurality of straps 236 for retaining the sheets 232 and 234 in place as described herebelow.

As can be seen from FIG. 28, each of the bridges 42 supporting the conductors extends between adjacent chains of the rolling conductor support and has opposite upturned end portions 72 and 74 secured to the inner link 120 of each chain by the pivot parts 214. Such upturned ends on the bridges 42 terminate spaced from the upper marginal edges of the links 120 and the flexible sheet extends laterally between the chains with its opposite marginal edges supported on the bridge portions 72 and 74. As the edges of the sheet lie spaced below and covered by the links 120, no sharp sheet edge is exposed to catch or snag clothing, or to be bumped against. Likewise, the lower sheet member 234 underlies the main portion of bridge 42 and lies spaced above the lower marginal edges of links 120 so that its edges are not exposed.

The flexible sheets 232 and 234 are retained in position on the support by means of a plurality of retaining straps 236 extending thereacross and having opposite ends engaged with the link slots 228 and 230. One of the straps is shown in FIG. 26 and comprises a body portion 238 having longitudinally extending central ribs 240 and flared marginal edges 242 and 244. The ribs 240 give the straps the requisite rigidity, while the flared edges 242 and 244 contact the sheet members 232 and 234 and present smooth surfaces to prevent chafing against the sheets during slight relative movement between the straps and sheets. Each strap has flat opposite end portions 246 and 248 displaced out of the plane of the body portion 238. All of the straps are identical, and those used for retaining the bottom sheet 234 are inverted from the ones retaining top sheet 232, as shown in FIG. 29.

Each strap 236 overlies its respective sheet 232 or 234, with surfaces of the body portion 238 engaging the sheet and the flared edges 242 and 244 spaced from the sheet. Opposite ends 246 and 248 of the straps are engaged within the slots 228 or 230 in links 120, and the slots are so positioned with respect to the sheets 232 and 234 that the straps 236 are held retained between the marginal edge of the slots and the marginal edge of the sheets. While each of the links 120 have been provided with slots 228 and 230 for ease of manufacture, it has been found that sufficient retention can be achieved by positioning the straps 236 spaced in every other link.

There may also be provided on the rolling conductor supports of the character described means forming a platform upon which workmen and/or machine operators may stand while attending to the machine element 20, as shown in FIGS. 31—34 inclusive. To provide such a platform, each chain link is constructed in slightly different fashion from that previously described. In FIG. 33 there is shown a rolling conductor support comprising the bridges 42 extending between two chains made up of links 250 each of which are generally shaped and provided with apertures and slots identical to the links 38 or 120, differing therefrom in that they are provided with an integral flange portion 252 substantially perpendicular to the plane of the link. Extending laterally across the support and juxtaposing the flanges 252 at opposite ends are platform members 254, preferably made out of wood, although other materials having the requisite strength may be used. The platform members 254 may be secured to the support by bolts, rivets or the like extending therethrough and through the flanges 252.

As can be seen in FIGS. 31 and 32 the flanges 252 and platform members 254 do not extend the entire length of the links 250, so that the members 254 lie in spaced apart parallel relation to form a series of slats to support a workman or machine operator or the like. Referring to FIG. 34, it can be seen that the links may be made as shown at 250', with a flange 252' turned inwardly instead of outwardly as shown in FIG. 33. The platform members 254 in this instance are positioned and secured identically as above described, and preferably project slightly beyond the plane of each link 250', as shown at 256. The pivot parts 214 securing the links together are identical to those described with reference to the various other FIGS. of the drawings. FIG. 31 shows a construction in which the links 250 and 250' are alternated to make a chain, with platform members 254.

The term "conductor" used herein and in the appended claims is intended to cover both electrical conductors and fluid conductors, or any other flexible energy-transmitting conductor which lends itself to application with a rolling support.

What I claim is:

1. A rolling conductor support comprising: a plurality of chains connected together in laterally spaced-apart relation by conductor carrying means extending therebetween, each chain including a succession of links having contiguous overlapping pivotally connected end portions, characterized in that the pivotal connection includes a pair of spaced pivot parts extending laterally between and connecting together the overlapping end portions, at least one of said pivot parts providing a fulcrum for pivotal movement between the links, at least one of the overlapping end portions having a slot of determined arcuate length measured in relation to said fulcrum, and the other pivot part interfitting in said slot and fixed to the other overlapping end portion and movable in the slot through the arcuate length thereof to limit pivotal movement between the links.

2. The invention defined in claim 1 further characterized in that a second slot is provided in one of said overlapping end portions of determined arcuate length measured in relation to said other pivot part, and said pivot part providing the fulcrum is fixed in relation to one of the overlapping ends and interfits in the last-mentioned slot for movement through the arcuate length thereof, whereby successive links fulcrum about both pivot parts and are limited in pivotal movement by said slots.

3. The invention defined in claim 1 characterized in that opposite ends of each link are laterally offset in opposite directions by substantially the thickness of the link.

4. The invention defined by claim 1 wherein the links of each chain are identical and the plurality of chains are identical.

5. The invention defined by claim 1 characterized in that said slot is arcuately shaped on a radius whose center coincides with the pivot part comprising said fulcrum, and said slot is spaced longitudinally along the link from such pivot part.

6. The invention as defined in claim 1 characterized in that said pivot part which interfits in said slot is provided with a radially extending retaining portion overlying and completely covering and concealing the slot.

7. The invention defined in claim 1 characterized in that laterally projecting chain-supporting roller means are provided coaxially aligned with and secured to the pivotal connection between successive links for riding supporting tracks along which the conductor support is rolled out.

8. The invention defined in claim 1 further characterized in that said pivot part providing the fulcrum is fixed in relation to both overlapping end portions.

9. The invention defined by claim 8 wherein the links of one chain are allochiral with the links of another chain.

10. The invention defined in claim 1 characterized in that said conductor-carrying means comprises a plurality of conductor-supporting bridges connected at opposite ends to said pivot parts of the chains.

11. The invention defined in claim 10 characterized in that opposite ends of each conductor supporting bridge includes an upstanding flange floatingly connected to said pivot parts allowing relative displacement of the bridges and chains.

12. The invention defined in claim 1 further characterized in that a pair of thin flexible protective sheet members extend in spaced substantially parallel relation between said chains with the conductors and conductor-carrying means interposed therebetween, and sheet-retaining means coupled to the chain links for maintaining the sheets in place with respect to said support.

13. The invention defined in claim 12 further characterized in that said support exhibits portions for abutting said sheet members along opposite marginal edges thereof to maintain said sheets in spaced relation with respect to the conductors carried by said carrying means.

14. The invention defined in claim 12 further characterized in that at least some of said links have apertures adjacent the longitudinally extending marginal edges thereof, and strap means extending laterally across said sheets secured at opposite ends within said apertures to maintain the sheets within the said marginal edges of the chain links.

15. The invention defined in claim 1 characterized in that said conductor-carrying means comprises a plurality of conductor-supporting bridges spaced apart along the chains and connected at opposite ends to said chains and upon which conductors extending along between the chains are supported, and conductor-retaining means are provided overlying the conductors and coupled to said support.

16. The invention defined in claim 15 characterized in at each bridge exhibits a plurality of closely spaced apertures extending therethrough to bracket each conductor on the bridge, and said conductor-retaining means comprises a retainer loop embracing each conductor and having end portions extending through and anchored in the apertures bracketing the conductor.

17. The invention defined in claim 16 characterized in that the apertures are arranged in a plurality of staggered rows extending longitudinally across each bridge.

18. The invention defined in claim 16 characterized in that said retainer loop comprises a strap having resilient catch means allowing adjustable retention in a bridge aperture through which received comprising a plurality of tabs extending angularly of the strap in longitudinally spaced relation throughout at least one end portion of the strap and facing in a direction to resist withdrawal of the end portion from an aperture in the bridge.

19. The invention defined in claim 18 characterized by the tabs being located in longitudinally spaced relation at opposite end portions of the strap, with the tabs in one end portion being more closely spaced than the tabs of the opposite end portion.

20. The invention defined in claim 18 characterized in that said tabs extend from opposite longitudinal marginal edges of the strap and within the plane of the strap for engagement with opposite marginal edge portions of the bridge apertures.

21. A rolling conductor support adapted to be secured between relatively horizontally moving machine elements with one span of the support moving relative to and spaced vertically from another span and rolling around a bend connecting the spans, characterized by the provision of means for supporting the upper span upon the lower span while spaced vertically above the lower span comprising a vertically extending spacer connected to and carried by the support and projecting from one span thereof toward the opposite span and movable with the support around the bend connecting the spans, said spacer provided with a part at its distal end for riding the opposite span and transmitting the load therebetween.

22. The invention as defined in claim 21 characterized in that said spacer comprises a V-shaped bracket connected at the ends of the V-arms to opposite edges of the support in one span thereof with the apex of the V-arms to opposite edges of the support in one span thereof with the apex of the V provided with a roller for engaging and riding the support in the opposite span thereof.

23. A rolling conductor support system, comprising, in combination: a plurality of chains connected together in laterally spaced-apart parallel relation by a plurality of laterally extending bridges spaced apart along the length of the chains, each chain including a succession of identical links having contiguous end portions arranged in overlapping relation, a pivot pin pivotally connecting together the overlapping contiguous ends of successive links, each link having at one end an arcuate slot spaced from the pivot pin, the end of the next successive link overlapping said one end having a part projecting into the slot for limiting relative pivoting between the links, each bridge having opposite end portions secured to the pivot pin and to said projecting part of confronting links of the chains, at least one conductor extending along the length of the chains and lying on the bridges, and means embracing the conductor at each bridge and secured to each bridge retaining the conductor on the bridges.

24. A rolling conductor support system comprising, in combination: at least two conductor supports stacked in parallel spaced-apart relation, each support including a plurality of chains connected together in laterally spaced relation by conductor-carrying means extending laterally therebetween, each chain having a succession of links with overlapping end portions pivotally connected together for pivotal movement, one of said supports having means for maintaining the supports in stacked parallel spaced-apart relation including spacers connected to said chain links at intervals therealong, each spacer having a first portion adapted to abut an adjacent chain for maintaining the supports spaced apart and second portion overlying the adjacent chain for maintaining the supports in laterally aligned parallel relation.

25. The invention defined in claim 24 characterized in that each spacer member comprises opposite end portions offset from each other and joined together by a transverse intermediate portion, one end portion secured to the inner surface of a chain link on one support and the other end portion overlying the outer surface of a chain link on another support, for maintaining the supports in laterally parallel alignment, and said intermediate portion adapted to abut the marginal edge of a chain link of the other support to maintain the supports in spaced-apart relation.

26. A rolling support system, comprising a plurality of chains extending in laterally spaced-apart parallel relation, each chain including a succession of links having contiguous end portions arranged in overlapping relation, a pivot pin pivotally connecting together the overlapping ends of adjacent links, each link having adjacent one end an arcuate slot spaced from the pivot pin with the end of the next adjacent link overlapping the said one end having a part projecting into the slot for limiting relative pivotal movement of the links, at least some of said links having integral marginal flange means extending perpendicular to the plane of the link, and a plurality of platform members extending laterally across the chains and having opposite end portions connected to said flange means.

27. The invention as defined in claim 26 characterized in that said platform members are each of a width less than the length of said links and each member extends between and is connected at its opposite ends to links of said chains in laterally aligned confronting relation.

28. The invention as defined in claim 26 characterized in that a plurality of bridge members extend between said chains in spaced apart relation and substantially parallel to and spaced from said platform members, each bridge member coupled at its opposite ends to said pivot pins and said projecting part respectively on said links, and retainer loops having end portions releasably engageable in the bridge members for retaining a conductor on the members.